United States Patent [19]

Cope

[11] Patent Number: 4,583,089
[45] Date of Patent: Apr. 15, 1986

[54] DISTRIBUTED COMPUTER CONTROL SYSTEM WITH VARIABLE MONITOR TIMERS

[75] Inventor: Michael E. Cope, Farmers Branch, Tex.

[73] Assignee: Foster Wheeler Energy Corporation, Livingston, N.J.

[21] Appl. No.: 486,316

[22] Filed: Apr. 19, 1983

[51] Int. Cl.[4] .......................... H04J 3/02; G06F 11/00
[52] U.S. Cl. ............................ 340/825.05; 340/825.5; 370/85; 370/86; 371/8
[58] Field of Search ...................... 340/825.01, 825.04, 340/825.05, 825.51, 825.5, 825.16; 370/86, 85, 98; 371/8, 62, 33

[56] References Cited

U.S. PATENT DOCUMENTS

| | | | |
|---|---|---|---|
| 4,058,681 | 11/1977 | Imaizumi et al. | 370/85 |
| 4,304,001 | 12/1981 | Cope | 371/8 |
| 4,410,983 | 10/1983 | Cope | 371/8 |
| 4,495,493 | 1/1985 | Segarra et al. | 340/825.5 |

*Primary Examiner*—Donald J. Yusko
*Assistant Examiner*—Sharon L. Hodgkins

*Attorney, Agent, or Firm*—John E. Wilson; Marvin A. Naigur; Richard L. Aitkin

[57] ABSTRACT

In a distributed computer control system in which remote stations are interconnected by a communications link, the remote stations take turns having supervisory control over the communications link. Each remote is numbered in sequence in a predetermined succession order and takes its turn having control of the communications link in accordance with this succession order. When a remote station has completed its turn of having supervisory control, it transmits a first control message over the communications link. The next remote station in the succession order then takes control over the communications link by transmitting a second control message over the communications link. Each remote station has two variable timers which are set in response to the first control message and the second control message, respectively, and have time out intervals depending upon the offset of the receiving remote station from the remote station which transmitted the control message. If and when any of these variable timers times out in a given remote station, then that remote station will assume control of the communications link by transmitting the second control message on the communications link.

7 Claims, 6 Drawing Figures

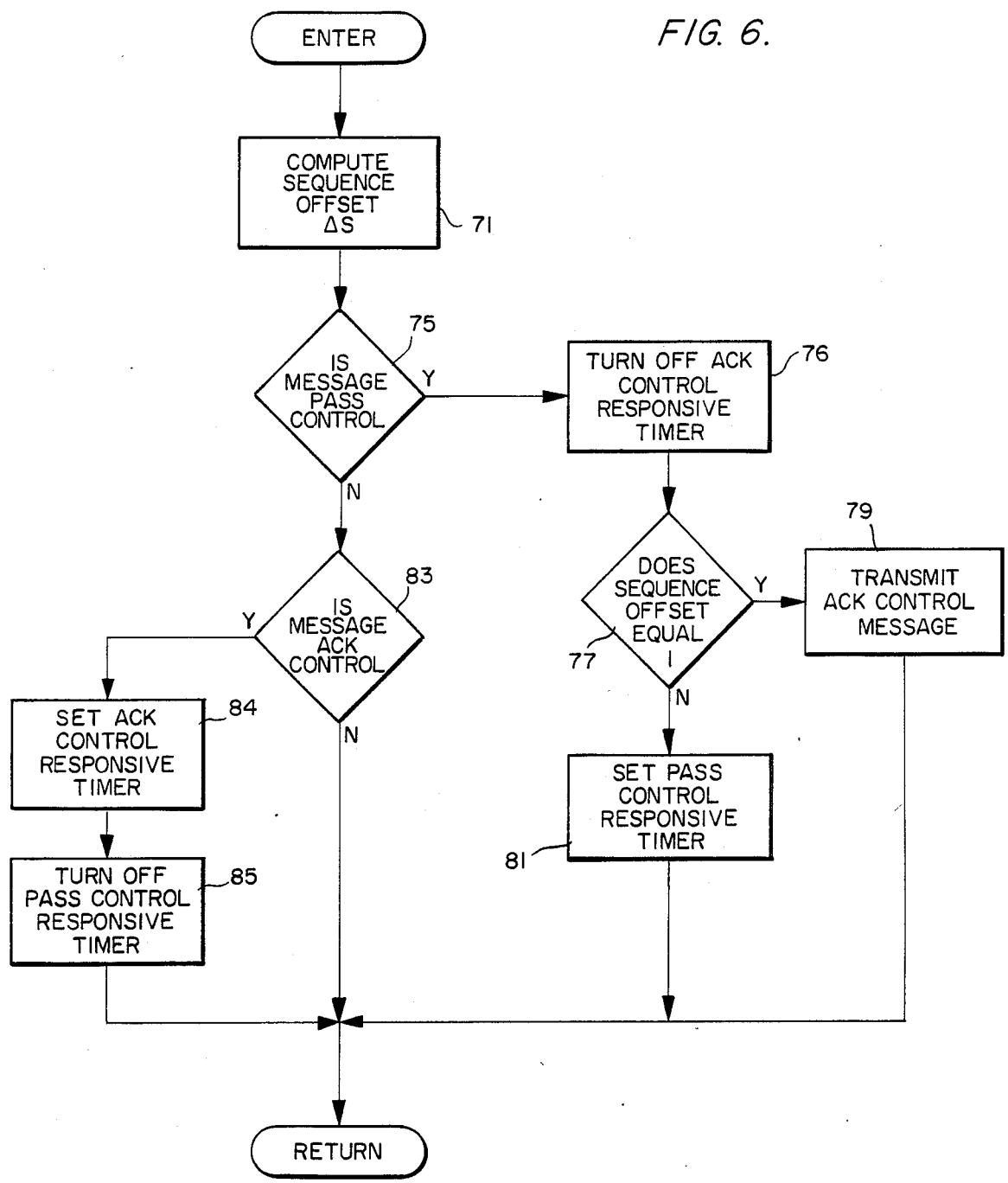

DISTRIBUTED COMPUTER CONTROL SYSTEM WITH VARIABLE MONITOR TIMERS

CROSS REFERENCE TO RELATED APPLICATION

This application is related to application Ser. No. 277,646, filed June 26, 1981, invented by the inventor of this application, now U.S. Pat. No. 4,410,983, which is a continuation of application Ser. No. 115,161, filed Jan. 24, 1980, now U.S. Pat. No. 4,304,001.

BACKGROUND OF THE INVENTION

The present invention relates to control systems of the type having a plurality of remotely located process control units connected together through a communications link and, more particularly, to a control system in which each of the remote units sequentially assumes supervisory communication control of the communication link.

Many system type industrial installations, for example, those related to industrial process-type manufacturing and electrical power generation, employ a large number of physically distributed controlled devices and associated sensors for effecting coordinated operation of the overall system. In the past, coordinated control of the various devices has been achieved by manual operation and various types of semi-automatic and automatic control systems including electro-magnetic relay systems, hardwired solid-state logic systems, and various types of computer control systems. The computer systems have included central systems in which the various sensors and controlled devices are connected to a central computer and distributed control systems in which computers at remote stations are connected to the controlled devices and the remote stations are connected over a communications link to one another. The successful functioning of the control system is vital to any industrial process, and, accordingly, distributed systems have generally been preferred over central systems because the failure of one of the remotely located control computers generally does not cause a system wide failure as in the case of the failure of the central computer in the central system. However, in many distributed computer systems, one of the remote stations or a specially designed control unit generally handles supervisory communication control of the communication link and, for these systems, failure of the communication link supervisor can lead to a system-wide failure.

Recently there have been developed systems in which none of the remote stations, called remotes, is assigned permanent supervisory control over the communications link. Instead, each of the remotes takes turns controlling the communications link and, while in control, each remote may transmit information to other remotes and make requests to other remotes for information and receive information back in response to these requests. One such system is disclosed in the patent to Michael E. Cope, Pat. No. 4,304,001. In the system of this patent, each remote is assigned a unique sequence number in a predetermined succession order with each remote unit assuming supervisory communication control of the communications link on a revolving basis in accordance with the remote's relative position in the succession order. When one of the remote stations is in control of the communications link and it is time for that remote to relinquish control over the communications link, it does so by transmitting a control message addressed to the next remote in the succession order. The next successive remote addressed by the control message then takes over the communications link. The remaining remote stations, other than the next successive remote, all set variable transfer monitor timers depending on their position in the succession order from the next successive remote. The further a given remote is from the next successive remote, the longer the time out interval that is set in the transfer monitor timer for the given remote. Each of the remotes is designed to assume control over the communications link if the time interval set by its transfer monitor timer expires before a preceding remote in the succession order assumes control. In this manner, if one or more of the remotes for any reason fails to take control over the communications link, the next functioning remote in the succession order will take over control.

SUMMARY OF THE PRESENT INVENTION

The present invention is an improvement over the system disclosed in the Cope Pat. No. 4,304,001. The system of the present invention comprises a plurality of remote stations connected to a communications link, as in the Cope patent. In accordance with the present invention, each remote has two variable transfer monitor timers instead of one. When a remote gives up supervisory control of the communications link, it transmits a transfer control message, which contains its own sequence number in the succession order and also a special universal address which indicates that the message is to be received by all remote stations connected to the communications link. Each remote station compares its sequence number with the sequence number of the transmitting remote and the next successive remote, upon determining that its succession number is one greater than the succession number of the transmitting remote, will take over control of the communications bus by transmitting a second transfer control message, which also has a universal address so that this message will be received by all of the remote stations connected to the communications link. In accordance with the present invention, each time one of the remotes transmits a message to transfer control over the communications link, each of the remaining remotes, except the next successive remote, will set a variable timer depending on how far removed the remote is from the transmitting remote. In this respect, the system functions in a manner similar to that described in the above mentioned Cope Pat. No. 4,304,001. Should this first variable transfer monitor timer in a given remote time out before another remote assumes control over the communications link, then that given remote station will take over control of the communications link. When a remote takes control over the communications link, the first transfer monitor timer in each remote is turned off until another message is transmitted over the communications link to again transfer control over the communications link to the next remote in turn. Each remote, except the remote taking control of the communications link, sets a second transfer monitor timer at the tire a remote assumes control by transmitting the second transfer control message. The time out interval of the second transfer monitor also depends on the position of the remote in the succession order from the remote which assumed control. The further a remote is from the remote assuming control, the longer will be the time out interval. This time out interval for the second transfer monitor timer is longer than the time out interval for the first transfer monitor timer and is set to be long enough to give the remote which takes over control over the communications bus its alloted time to have control over the communications link. If in a given remote the second transfer monitor timer times out before control over the communications link is transferred to the next remote in the succession order, then that given remote will assume control over the communications link. By means of this second transfer monitor timer, a malfunctioning remote which assumes control over the communications link, but then does not give up control over the communications link after its alloted time interval to have control, is forced to give up control of the communications link to the next operative remote in the succession order. By using two transfer monitor timers, one working on a relatively short time interval in response to the first control message and the other one working on a longer time interval in response to the second control message, delays in the transfer of control over the communications link are avoided in those instances when a given remote is completely nonoperative and not taking its turn in the succession order. In addition, transfer in the correct succession order is forced to occur even in those instances when a given remote takes control of the communications bus, but through a malfunction fails to give up control.

BRIEF DESCRIPTION OF THE DRAWINGS

FIG. 6 is a flow chart illustrating in detail the manner in which the communication controller of FIG. 3 controls the variable timers employed in the communications controller in accordance with the present invention.

DESCRIPTION OF THE PREFERRED EMBODIMENT

Figure 1:
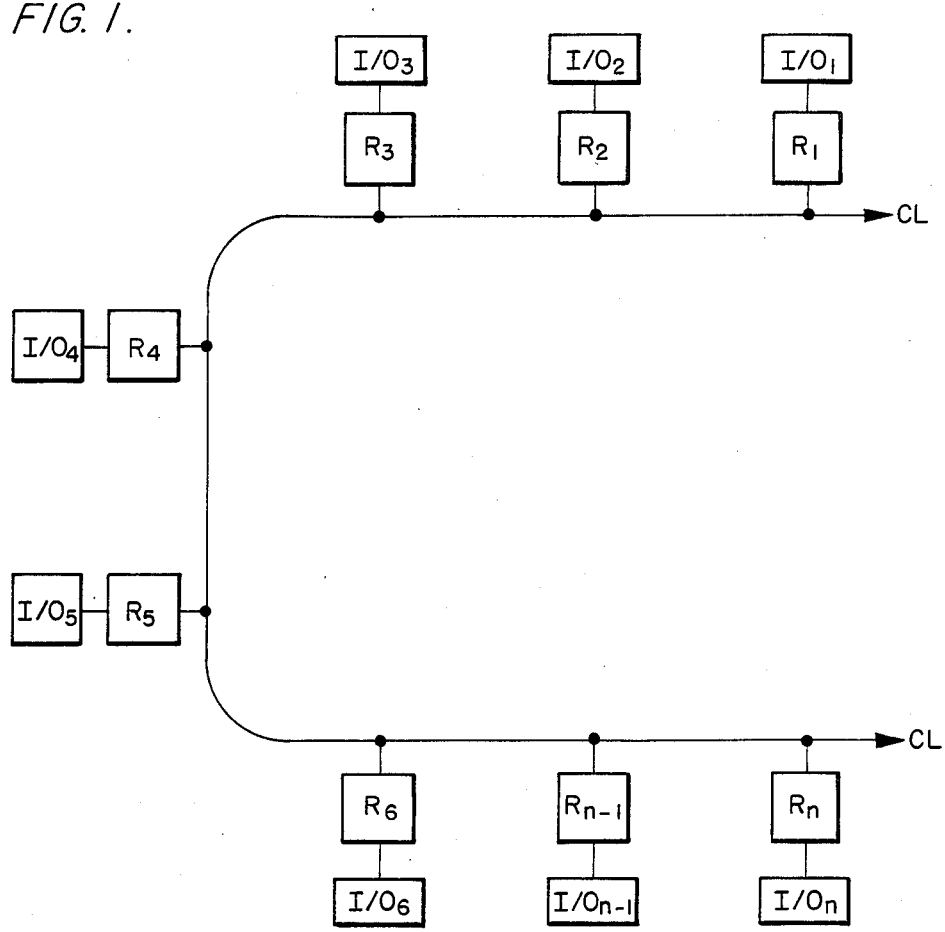
FIG. 1 is a schematic diagram of a process control system including a plurality of remote stations connected to a common communications link in accordance with the present invention.

An industrial control system in accordance with the present invention is shown in schematic form in FIG. 1 and includes a communications link CL having a plurality of remote process control units (remotes) $R_1, R_2, \ldots R_{n-1}, R_n$ connected thereto. The communications link CL is shown as an open line, single channel configuration, but it may include a second redundant channel as dislcosed in the above mentioned Cope Pat. No. 4,304,001. While the system configuration shown in FIG. 1 is a distributed open loop or shared global bus type, the invention is equally suitable for application to central systems or central/distributed hybrid configuration. The system of FIG. 1 is adapted for use in controlling an industrial process, e.g., the operation of a power generating plant, with each remote unit $R_n$ connected to one or more associated or corresponding input/output devices $I/O_1, I/O_2, \ldots I/O_{n-1}, I/O_n$ such as, but not limited to, various types of sensors (temperature, pressure, position, and motion sensors, etc.) and various types of controlled devices (motors, pumps, compressors, valves, solenoids, and relays, etc.).

Figure 2:
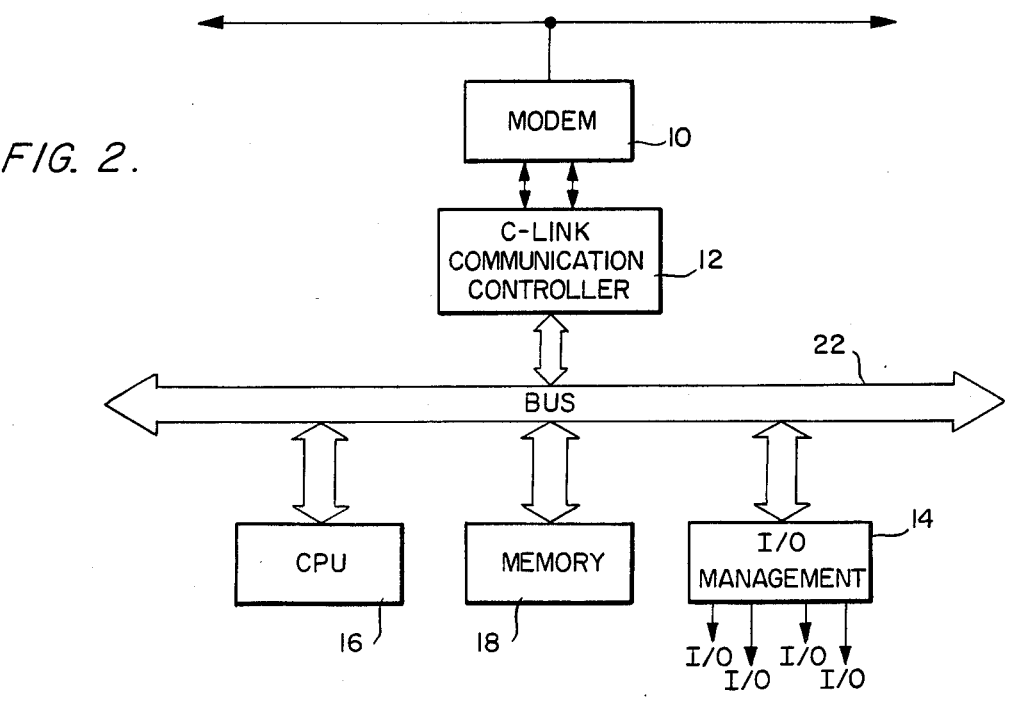
FIG. 2 is a schematic block diagram of an exemplary process control unit comprising a remote station of the type shown in FIG. 1.

The architecture of an exemplary remote $R_n$ is shown in FIG. 2 and includes a modem 10; a communication controller 12; an input/output management device 14; a central processing unit (CPU) 16; and a memory 18; and a common bus 22 which provides addressing, control, and information transfer between the various devices which constitute the remote. The remote may also include a peripheral device connected to the bus 22 that could include a CRT display, printer, or a keyboard. The function of the modem 10 is to interface the communication controller 12 with the communications link CL and modulates a transmitted signal with the digital data to be transmitted and demodulates the received signal containing digital data, as described in the above mentioned Cope patent.

Figure 3:
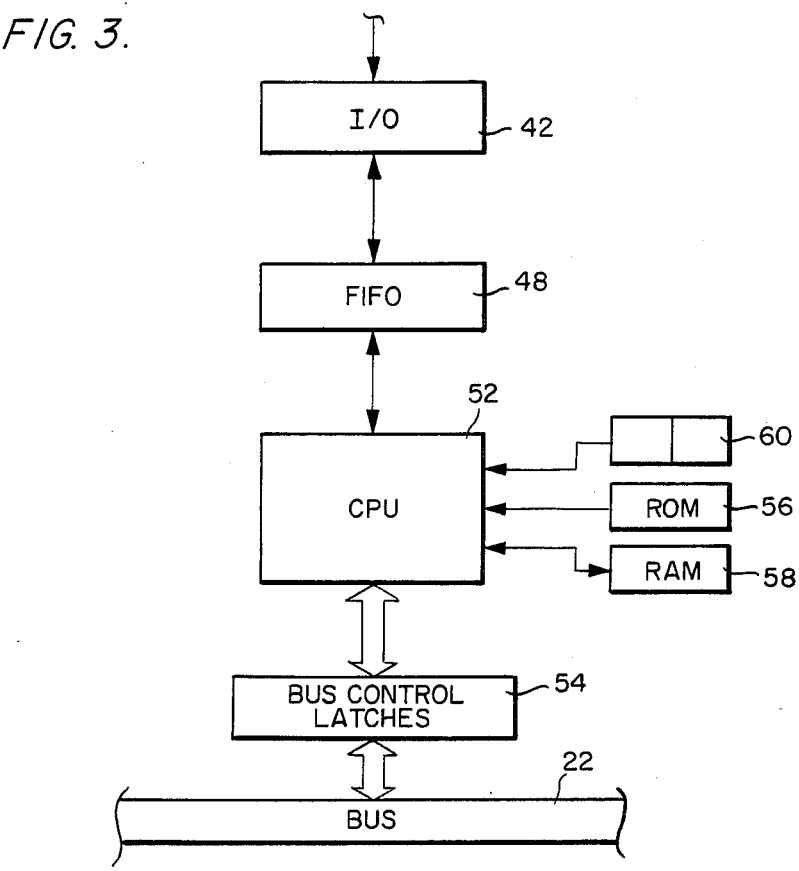
FIG. 3 is a schematic block diagram of a communication controller employed in the remote station shown in FIG. 2.

As shown in more detail in FIG. 3, each communication controller 12 includes an input/output port 42, which interfaces with the modem 10. A first-in first-out (FIFO) serializer 48 is connected between the input/output port 42 and a CPU data processor 52. The first-in first-out serializer 48 functions as a temporary store for storing information blocks provided to and from the modem. The CPU 52, in turn, interfaces with the bus 22 through bus control latches 54. A read only memory (ROM) 56 containing a resident firmware program for the CPU and a random access memory (ROM) 58 are provided to permit the CPU to effect its communication function as described more fully below. Manually operable DIP switches 60 are also provided to permit data to be individually provided manually to the communications controller.

The input/output management device 14, a detailed description of which is not necessary to an understanding of the present invention, is preferably a firmware controlled microprocessor-based device which is adapted to scan the various input/output hardware points, effect data collection and distribution to and from the input/output points, format the collected data in preferred formats, and assemble the data in selected sequences as well as place data in memory for subsequent transmission.

As mentioned above, the remotes are provided with active processing capability by interfacing a central processing unit 16 and corresponding memory 18 with the remote bus 22. For example, in those remotes that monitor and control a specific operating characteristic of a process step, such as a temperature or pressure variable, a microprocessor 16 with an appropriate applications program can be provided to measure the actual operating characteristic, effect a comparison between the actual operating characteristic and the preferred set point, and effect one or more input/output actions in accordance with predetermined process control algorithms.

Each remote $R_n$ takes turns in having supervisory control over the communications link CL and when a remote has supervisory control over the communications link, it is referred to as the master of the communications link. The remotes are numbered in sequence to define a succession order and each remote takes turn in being master of the communications link in accordance with its sequence number in this succession order. When a remote is master of the communications link, it may send digital data to another remote or it may request and receive data from a remote over the communications link. When the remote is not master, it may send information over the communications link to another remote only in response to a request for information from the remote that is master. When a remote becomes master, it carries out any needed communication with other remotes and, when it has finished with this communication, it signals this fact by transmitting a special message universally addressed to all of the remotes over the communications link called a PASS CONTROL message. In response to this PASS CONTROL message, the next remote in the succession order becomes master and takes over control of the communications link by transmitting another special message universally addressed to all of the remotes over the communications link, which special message is called an ACK CONTROL message. Each remote is allotted a predetermined time interval to be master and if a remote does not complete all its communications with other remotes in its allotted time interval, it will normally transmit a PASS CONTROL message at the end of its allotted time interval and await its next turn to be master to continue its communication with other remotes.

Information data is transmitted from one remote to another in information blocks and, when a remote is transmitting data in an information block to another remote, it includes the sequence number of the remote which is to receive the information block. A remote which is to receive an information block is called the destination remote. The sequence number of the destination remote in the information blocks acts as an address and causes the destination remote to receive the information block. The sequence number of each remote is provided to such remote by setting selected DIP switches 60 in the communication controller to represent the sequence number. The destination remote in response to receiving an information block addressed to it responds with an acknowledgement message addressed to the remote which transmitted the information block to indicate good reception of the information block. The acknowledgement message is called an ACK message, but this ACK message is different and should not be confused with an ACK CONTROL message, which is transmitted when a remote becomes master and assumes control over the communications link. If the remote receives an information block addressed to it, but the information block contains an error, the destination remote transmits a special nonacknowledgement message called a NAK message addressed to the remote which transmitted the information block to indicate that good data was not received. The remote which transmitted the information block may then retransmit the information block and the process may be repeated a number of times in the same manner as explained in the above mentioned patent to Cope Pat. No. 4,304,001.

Figure 4:
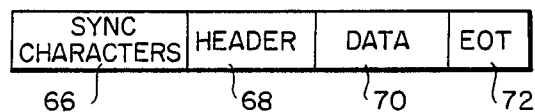
FIG. 4 illustrates the format of an exemplary illustrative information block in which information is transferred between remotes over the communications link.

The format of an information block is illustrated in FIG. 4 and includes a plurality of sync characters 66 at the beginning of the block followed by a multi-word frame called the header 68. The header 68 is followed by multi-word data frame 70, which may contain up to 200 bytes of data and is followed by an end of transmission character 72. The PASS CONTROL messages, the ACK CONTROL messages, the ACK messages and the NAK messages are also in the form of data blocks organized just like the information block shown in FIG. 5 except that they contain no data frame and the end of transmission character 72 follows immediately behind the header 68. When a data block is transmitted over the communications link, the remotes connected to the communications link will detect the presence of a data block by detecting the sync characters at the beginning of the data block and in response to detecting these sync characters will begin to receive the header 68 of the data block into the communication controller 12.

Figure 5:
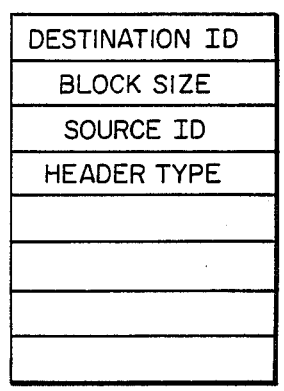
FIG. 5 illustrates the format of a header frame of the information block shown in FIG. 4.

FIG. 5 illustrates an exemplary format for the header frame and, as shown in FIG. 5, the first word of the header frame is the destination ID, which is the address and sequence number of the destination remote to which the data block is being sent. As explained above, each remote is assigned a sequence number in the succession order in which the remotes take turns being master of the communications link CL and the destination ID is the sequence number of the destination remote. The destination ID is a two digit hexidecimal number, which permits 255 remotes each having a different address or sequence number connected to the communications link ranging from 00 to FE(hex). FF(hex) is reserved to be a universal address for all of the remotes. As pointed out above, the PASS CONTROL message and the ACK CONTROL message are messages universally addressed to all the remotes. Accordingly, the destination ID in the header of the data block representing one of these messages is always FF(hex) and all of the remotes will receive these data blocks. Otherwise, only the destination remote which is identified in the destination ID will receive the data block. The communications controller upon receiving the destination ID compares it with sequence number set on the selected DIP switch, and, if it is the same or if the destination ID is FF(hex), the rest of the data block is received. Following the destination ID in the header frame is the block size which identifies the number of bytes in the data frame of the data block. In PASS CONTROL, ACK CONTROL, ACK and NAK data blocks, the block size will be zero since there is no data frame in these data blocks. Following the block size is the source ID which is the sequence number of the remote which transmitted the data block. Following the source ID is the header type, which is an identification of the type of data block being transmitted. The header type will indicate (1) if data block is an information block containing information in the data frame to be transmitted to the destination remote; (2) if the data block is a request for information from the destination remote; (3) if the data block is a PASS CONTROL message; (4) if the data block is an ACK CONTROL message; (5) if the data block is an ACK message; or (6) if the data block is a NAK message. Following the header type are additional words in the header frame which are not relevant to this invention, but which are described in more detail in the above mentioned Cope Pat. No. 4,304,001.

When a remote has information or a request to send to another remote, the communication with the other remote is organized as a transaction. A transaction may be a single information block, if the information to be sent is less than 200 bytes, or it may comprise a plurality of information blocks if the information to be sent is more than 200 bytes. If the transaction is a request for information from another remote, which is to send back a response to the request while the requesting remote is the master, then the information block or blocks sent by that other remote in response to the request is also a part of the transaction. When the CPU 16 carrying out an applications program for a given remote determines that it should carry out a transaction, it builds in the memory 18 a parameter block for the transaction. Then, using the data and directions in the parameter block, the communication controller 12 of the given remote formulates the information block or blocks of the transaction and causes them to be transmitted over the communications link to the destination remote when the given remote becomes master of the communications link. The parameter block will contain the information and directions needed by the communication controller to formulate the information block or blocks of the transaction and will include: (1) the transaction type, which will determine the header type in the information block or blocks of the transaction; (2) the location in the memory 18 where the data is to be found that is to be transmitted and that will comprise the data frame or frames of the information block or blocks of the transaction; (3) the identification (the sequence number) of the destination remote; and (4) the number of bytes of data that is to be transmitted in the data frame or frames of the informaton block or blocks of the transaction.

In accordance with the present invention, each remote, upon receiving a PASS CONTROL data block, determines whether it is the next remote in the succession order following the remote which transmitted the PASS CONTROL data block. If so, then that remote becomes master of and assumes control over the communications link by transmitting an ACK CONTROL data block over the communications link. Whenever a remote transmits an ACK CONTROL data block and becomes master of the communications link, it sets a timer with a time out interval equal to the time that each remote is allotted to be master over the communications link. This timer is called the master interval timer. If the remote that is master completes its communications before its master interval timer times out, the master remote will turn off its master interval timer and transmit a PASS CONTROL data block over the communications link. If the master interval timer times out before the master remote completes its communications with other remotes, the master remote will normally give up control of the communications link by transmitting a PASS CONTROL block and wait for its next turn to be master to complete its communications. All of the remotes receiving a PASS CONTROL data block, except the next one in the succession order following the remote which transmitted the PASS CONTROL data block, in response to the PASS CONTROL data block, will set a timer, the time out interval of which depends upon the sequence offset of the remote receiving the PASS CONTROL data block from the remote transmitting the PASS CONTROL data block. This timer is called the PASS CONTROL responsive transfer monitor timer. The sequence offset of a remote receiving a PASS CONTROL data block is what place in line the receiving remote is from the remote that transmitted the PASS CONTROL data block. The time out interval of the PASS CONTROL responsive transfer monitor timer is set to be $10^2 \times \Delta t \times \Delta S$ seconds, in which $\Delta t$ is the transmit clock period for each data bit transmitted over the communications link and $\Delta S$ is the sequence offset. If the PASS CONTROL responsive transfer monitor timer in a given remote times out, this will mean that the preceding remotes malfunctioned and failed to assume control over the communications link. The given remote will then assume control over the communications link by transmitting an ACK CONTROL data block over the communications link, at which time the given remote will set its master interval timer. Each remote in response to receiving an ACK CONTROL data block will turn off its PASS CONTROL responsive transfer monitor timer. In addition, each remote receiving an ACK control data block will set another timer to have a varible time out interval depending upon the sequence offset. This latter timer is called the ACK CONTROL responsive transfer monitor timer. The time out interval of the ACK CONTROL responsive transfer monitor timer will be set to be longer than the time interval that is allotted to each remote to be master of the communications link and, accordingly, will be set to be substantially longer than the time out interval of the PASS CONTROL responsive transfer monitor timer. Specifically, it will be set to equal $10^3 \times (2 + \Delta S) \times \Delta t$. Should the ACK CONTROL responsive transfer monitor timer in a given remote time out, this will mean that the remote which last became master of the communications link failed to transmit a PASS CONTROL data block at the end of its alotted time interval to be master and, in addition, any remotes between the remote which last became master and the given remote in the succession order malfunctioned in failing to become master. The given remote in which the ACK CONTROL transfer monitor timer has timed out will then become master of the communications link by transmitting an ACK CONTROL data block, at which time the given remote will set its master interval timer. The ACK CONTROL responsive transfer monitor timer is turned off in each remote in response to that remote receiving a PASS CONTROL data block from another remote. The PASS CONTROL responsive timer in the remote that transmits the PASS CONTROL data block is set in that remote at the time that it transmits the PASS CONTROL data block to a long time interval so it can regain control of the communications link if no other remote responds with an ACK CONTROL data block. This time out interval is set to be $5 \times 10^2 \times \Delta t \times$ (the total number of remotes connected to the communications link + the sequence number of the remote transmitting the PASS CONTROL data block).

These operations in setting and turning off the above described timers, as well as in formulating and transmitting the ACK CONTROL, PASS CONTROL, ACK, and NAK data blocks are all carried out by the communications controller 12.

Provision is made to permit a given remote to be programmed to stay master of the communications link for another allotted time interval following completion of its allotted time interval under special circumstances. In this situation, the remote, instead of transmitting a PASS CONTROL data block at the end of its allotted time interval, will transmit an ACK CONTROL data block and reset its master interval timer. The ACK CONTROL data block will reset the ACK CONTROL responsive timers in the other remotes and permit the given remote to remain master for another time interval. This feature is implemented by means of the parameter blocks which are built in the memory 18 by the applications program being carried out by the CPU 16 as explained above. When it is determined in the applications program being carried out by the CPU 16 that it is desired for the remote to remain master to complete a transaction for longer than the normal allotted time interval for a remote to be master, the applications program sets a flag in the parameter block built in the memory 18 for the transaction. This flag is called the message linking flag. The communication controller 12, upon the master interval timer of the remote timing out, will examine this message linking flag. If the flag is set, the communication controller, instead of transmitting a PASS CONTROL message, will transmit an ACK CONTROL message over the communications link and reset its master interval timer. On the other hand, if the message linking flag is not set, then the communications controller will transmit the PASS CONTROL data block over the communications link.

FIG. 6 is the flow chart of the routine of the program carried out by the communications controller 12 to control the PASS CONTROL responsive and ACK CONTROL responsive transfer monitor timers. The program of the communication controller 12 enters the routine of FIG. 6 whenever the remote receives a data block containig the universal address FF(hex). As shown in FIG. 6, the routine first enters instruction sequence 71, in which the sequence offset $\Delta S$ of the remote receiving the universally addressed data block from the remote which transmitted the data block is computed. This is done by subtracting the source ID in the header of the data block from the sequence number, set by the dip switches 60, of the remote receiving the data block. If this difference is positive, then this becomes the sequence offset. If the difference is negative, then the sequence offset is computed by algebraically adding the difference to the number of remotes connected to the communications link plus one. Then in decision sequence 75, the routine determines whether or not the received data block is a PASS CONTROL message by examining the header type in the header of the received data block. If the data block is a PASS CONTROL message, the routine branches to instruction sequence 76, in which the ACK CONTROL responsive timer of the remote is turned off and the routine enters decision sequence 77, in which it is determined whether the sequence offset determined in instruction sequence 71 is equal to one. If the sequence offset is equal to one, the routine branches to instruction sequence 79 in which it causes the ACK CONTROL data block to be transmitted over the communications link. As explained above, whenever a remote transmits the ACK CONTROL data block, it sets the master interval timer. Following instruction sequence 79, the routine returns to the main program of the communication controller. If the sequence offset does not equal one, then the routine proceeds from decision sequence 77 into instruction sequence 81, in which the PASS CONTROL responsive transfer monitor timer is set to equal $10^2 \times \Delta S \times \Delta t$ in accordance with the sequence offset $\Delta S$ determined in instruction sequence 71. The routine then returns to the main communication controller program. If in decision sequence 75, the program determines that the received universally addressed data block is not a PASS CONTROL message, the program proceeds into decision sequence 83 in which it determines whether the data block is an ACK CONTROL message by examining the header type in the header of the data block. If the message is not an ACK CONTROL message, then the program returns to the main program of the communications protocol controller. If the received data block is an ACK CONTROL message, the routine branches to decision sequence 84, in which the ACK CONTROL responsive transfer monitor timer is set to have a time out interval equal to $10^3 \times (2 + \Delta S) \times \Delta t$. Then, in instruction sequence 85, the routine turns off the PASS CONTROL responsive timer, whereupon the routine is completed and it returns to the main communication controller program.

The various timers which are used by the communication controller are implemented by the program of the communication controller. To set a timer in the communication controller, the CPU 52 will set a value in a selected timer storage location in the random access memory 58 corresponding to the time out interval for the timer. In addition, it will store a pointer to this timer storage location in a timer table stored in the random access memory 58. Then, under the control of a regular routine of a firmware program in the ROM 68, the CPU 52 will decrement the timer value stored in the timer storage location of the RAM 58 as long as the pointer to the timer storage location is stored in the timer table. To turn the timer off, the CPU 52 merely removes the pointer to the selected timer storage location from the timer table.

With the industrial control system as described above, control over the communications bus is efficiently transferred from one remote to the next. Should any one of the remotes malfunction either by failing to assume control over the communications link when its turn comes or by failing to give up control of the communications link, when its turn has ended, control of the communications link is nevertheless transferred to the next remote in an efficient manner and with minimum delay.

The above description is of a preferred embodiment of the invention and many modifications may be made thereto without departing from the spirit and scope of the invention, which is defined in the appended claims.

I claim:

1. A communication system comprising
a plurality of remote stations
a communications link interconnecting said remote stations, each of said remote stations being assigned a sequence number in a predetermined succession order in which said remote stations are to take turns in being master over said communications link
each of said remote stations including a communication controller means operable
to transmit messages to other remote stations over said communications link when such remote station is master of said communications link,
to transmit a first control message on said communications link when such remote has completed its turn at being master over said communications link, and
to transmit a second control message on said communications link to start its turn at being master over said communications link in response to receiving said first control message transmitted by the communication controller means in the remote station immediately preceding such remote station in said succession order,
the communication controller means in each remote station including first timing means responsive to said first control message being transmitted on said communications link to set a variable time out interval as a function of the offset in said succession order of such remote from the remote that transmitted the first control message with the greater the offset, the greater the time out interval,
the communication controller means in each remote station including a second timing means responsive to said second control message transmitted on said communications link to set a second variable time out interval as a function of the offset in said succession order of such remote from the remote that transmitted the second control message with the greater the offset, the larger the second time out interval, said second time out interval being greater than said first time out interval for a given offset, each communication controller means transmitting said second control message on said communications link when the first timing means of such communication controller means times out before transmission of said second control message on said communications link, and when the second timing means of such communications controller means times out before the transmission of said first control message on said communications link.

2. A communication system as recited in claim 1, wherein a plurality of input/output devices are connected to each of said remote stations and wherein said remote stations include means to apply signals to and receive signals from said input/output devices to control parameters of an industrial process.

3. A communication system as recited in claim 1, wherein each remote station has an allotted time interval to be master of said communications link and being operable when master of said communications link to transmit said second control message at the end of said allotted time interval, said second time out interval being longer than said allotted time interval.

4. A communication system as recited in claim 3, wherein the communication controller means in each remote station includes a third timing means operating to set a third time out interval equal to said allotted time interval when the communication controller means of such remote station transmits said second control message on said communication link, the communication controller means in each remote station being operable to transmit said first control message on said communications link when the third timing means in such communication controller means times out.

5. A communication system as recited in claim 3, wherein one of said remote stations includes means selectively operable to signal the communication controller of said one of said remote stations, that said one of said remote stations is to remain master for longer than the allotted time interval, the communication controller in said one of said remote stations in response to being signalled by said selectively operable means, upon reaching the end of its allotted time interval to be master of said communications link, operating to transmit said second control message on said communications link instead of said first control message.

6. A communication system as recited in claim 1, wherein said remote stations are assigned addresses and transmit information to each other over said communication link in information data blocks, said first control message and said second control message comprising control data blocks, each of said data blocks having a header address position, the header address position of each information data block containing the address of the remote to which the information data block is transmitted, the header address position of said control data blocks containing a predetermined universal address, each of said remote stations operating to receive a data block transmitted on said communications link only if the data block contains in said header address position the address of such remote or said predetermined universal address.

7. A communication system as recited in claim 1, wherein said first and second control messages each contain the sequence number of the remote station which transmitted the control message on the communications link, each of said remotes upon receiving one of said control messages determining its offset in said succession order from the remote which transmitted the control message by means of the sequence number in the received control message and the sequence number of the receiving remote station.

* * * * *

UNITED STATES PATENT AND TRADEMARK OFFICE
CERTIFICATE OF CORRECTION

PATENT NO. : 4,583,089
DATED : April 15, 1986
INVENTOR(S) : Michael E. Cope

It is certified that error appears in the above-identified patent and that said Letters Patent is hereby corrected as shown below:

On page 1, item 73, line 6, please delete

"Foster Wheeler Energy Corporation,
Livingston, N.J."

and insert in its place --Forney Engineering Company,
Carrollton, Texas--

Signed and Sealed this

Twelfth Day of August 1986

[SEAL]

Attest:

DONALD J. QUIGG

Attesting Officer

Commissioner of Patents and Trademarks